US008243685B2

(12) United States Patent
Kang et al.

(10) Patent No.: US 8,243,685 B2
(45) Date of Patent: Aug. 14, 2012

(54) IP HANDOFF METHOD IN MOBILE AGENT PLATFORM ENVIRONMENT

(75) Inventors: Sungsoo Kang, Seoul (KR); Seong-Gon Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 505 days.

(21) Appl. No.: 12/518,056

(22) PCT Filed: Aug. 3, 2007

(86) PCT No.: PCT/KR2007/003751
§ 371 (c)(1),
(2), (4) Date: Jun. 5, 2009

(87) PCT Pub. No.: WO2008/069397
PCT Pub. Date: Jun. 12, 2008

(65) Prior Publication Data
US 2010/0322186 A1   Dec. 23, 2010

(30) Foreign Application Priority Data
Dec. 8, 2006   (KR) .................. 10-2006-0125137

(51) Int. Cl.
*H04W 4/00* (2009.01)
(52) U.S. Cl. .................................................. 370/331
(58) Field of Classification Search .............. 370/331; 455/436, 439, 442, 444
See application file for complete search history.

(56) References Cited

U.S. PATENT DOCUMENTS

| 7,031,709 | B2 | 4/2006 | Watanabe et al. |
| 2004/0198383 | A1 | 10/2004 | Choi |
| 2005/0114543 | A1* | 5/2005 | Popovich et al. ............. 709/238 |
| 2006/0018291 | A1 | 1/2006 | Patel et al. |
| 2007/0091842 | A1* | 4/2007 | Siddiqi et al. ................. 370/331 |

FOREIGN PATENT DOCUMENTS

| KR | 10-2004-0105422 | 12/2004 |
| KR | 10-2005-0091611 | 9/2005 |

OTHER PUBLICATIONS

International Search Report mailed on Nov. 13, 2007 in connection with International Application No. PCT/KR2007/003751.

* cited by examiner

*Primary Examiner* — Derrick Ferris
*Assistant Examiner* — Mang Yeung
(74) *Attorney, Agent, or Firm* — Staas & Halsey LLP

(57) ABSTRACT

Provided is an Internet protocol (IP) handoff method in a mobile agent platform (MAP). Accordingly, when an IP address of a mobile node (MN) is changed while the MN moves from an MAP to an adjacent MAP, the two MAPs generate border lists so as to share information on the MN, so that it is possible to perform a rapid IP handoff.

8 Claims, 7 Drawing Sheets

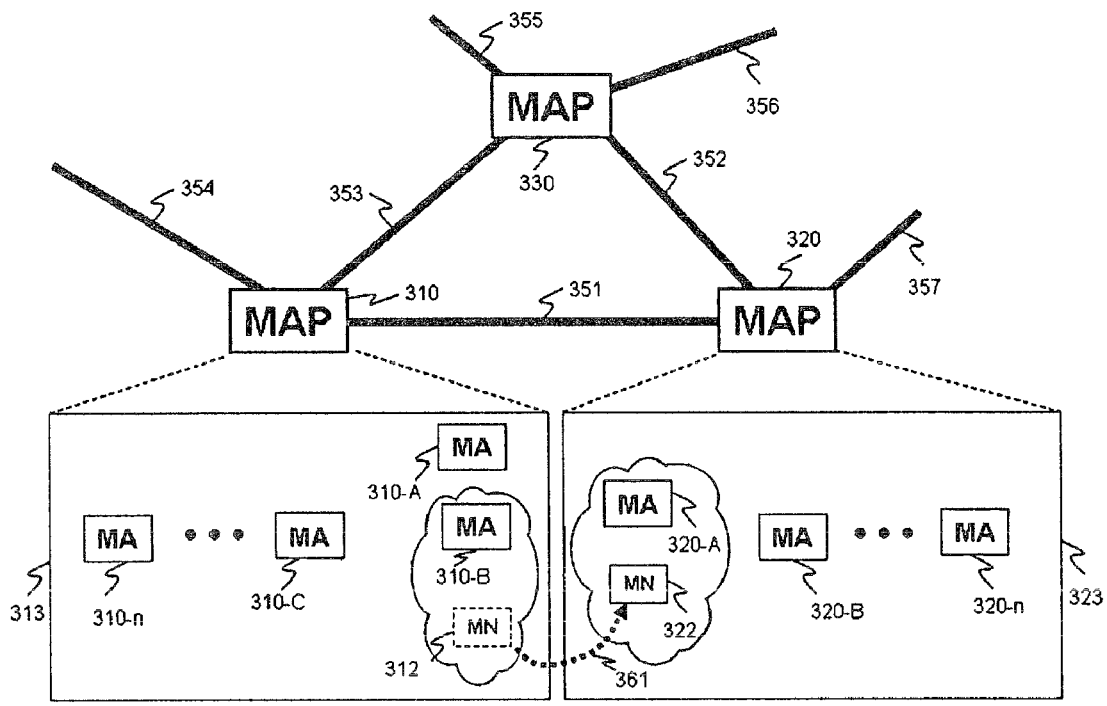

IP HANDOFF METHOD IN MOBILE AGENT PLATFORM ENVIRONMENT

CROSS-REFERENCE TO RELATED PATENT APPLICATION

This application claims the benefit of Korean Patent Application No. 10-2006-0125137, filed on Dec. 8, 2006, in the Korean Intellectual Property Office, the disclosure of which is incorporated herein in its entirety by reference.

BACKGROUND OF THE INVENTION

1. Field of the Invention

The present invention relates to an Internet protocol (IP) handoff method, and more particularly, to a handoff method between mobile agents (MAs) with respect to mobile nodes (MNs) in an environment including a plurality of mobile agent platforms (MAPs).

2. Description of the Related Art

As a handoff for a mobile Internet protocol (IP) referring to a book "IP-based next-generation wireless networks" by Jyh-Cheng & Tao Zhang (John Wiley & Sons Inc., 2004), there are an Intra-subnet handoff, an Inter-subnet handoff, and Inter-router handoff. A case where a moving mobile node (MN) needs a new IP subnet address corresponds to the Inter-subnet handoff and the Inter-router handoff for changing a jurisdiction address region of a router. A case where an MN that moves to an adjacent cell is in a jurisdiction address region cell of the same router corresponds to the Intra-subnet handoff. In the Intra-subnet handoff, the same IP subnet address is used, so that an IP handoff does not occur. Namely, when the MN visits a region having a different IP address region in a mobile IP network, a foreign agent (FA) that operates as a virtual router in an external network gives the MN a care of address (CoA), the MN registers the CoA at a home agent (HA) through the FA, the HA encapsulates data transmitted from the MA to transmit the encapsulated data to the CoA, and FA solves the encapsulated data and to transmit the solved data to the MN. In this case, the FA operates as a default router of the MN for the data transmitted from the MN.

However, when a signal path and a data path for the handoff described above are used together, there is a problem in that head-of-line blocking between routers for managing the IP subnet occurs.

U.S. Pat. No. 7,031,709 B2 (Apr. 18, 2006) provides a geographical FA topology relation in a case where a number of network providers and various wired/wireless access networks exist. More specifically, a provider Z which possesses subscribers but not access networks can acquire a new CoA when a node moves from A region to B region, an FA of the B region requires a possible CoA through an FA of the A region, and a HA of the provide Z can form a topology and a Map for access networks which are different from each other based on a mobility history of a subscriber node, so that the node can predict a mobility path and a rapid handoff can be performed. This method has an advantage of in that the method can be applied even when a construction statue of the access network is not known. However, there are problems in that it takes time for the HA to collect and learn the history of the mobility of the MN, and a conventional method of acquiring a CoA when the MN moves has to be changed. In addition, requiring a CoA of another region through the FA of a region may have a danger of a malicious attack. Namely, an impossible CoA in the B region is transmitted to the HA through a FA in another A region, so that a possibility of occurrence of binding update and deny message between the HA and the FA of the B region is very high.

As discussed by the Internet Engineering Task Force (IETF), a regional registration method of employing a gateway foreign agent (GFA) which is disposed above the FAs having different address regions from each other and registering a CoA provided from the GFA for the MN is introduced. However, in a case where signal packets or the handoff and IP data packets of the MN are used together, the problem of head-of-line blocking which is a characteristic of an IP network still remains. In addition, the MN needs an operation of registering with not only the conventional HA but also the GFA when perceives existence of the GFA.

In order to compensate for the disadvantages, a method provided in United States Patent 2005/0114543 A1 (May 26, 2005) which can be applied to the MN that cannot perceive the existence of the GFA is introduced. In this method, when the MN requests a registration of the HA through the FA, the GFA is disposed between the FA and the HA, so that the GFA adds an IP address of the GFA to an extension field of a registration request message of the MN transmitted from the FA. When the MN moves from the FA of the A region to the FA of the B region and the MN is registered with the GFA in advance, the MN receives a response with respect to a registration confirmation in an operation of confirming the registration request. When the MN is not registered, a new visitor entry is generated and added to a visitor list in the GFA, and the IP address of the GFA is added to an extension field of the registration request message of the MN transmitted from the FA of the B region, thereby transmitting the registration request message to the HA of the MN. In this case, there is an advantage in that conventional operations pf registering the MN at the normal HA can be used. However, there is a problem in that the operations can be performed only when the HA, GFA, and FA can perceive and process existence of the address of the GFA in the extension field of the registration request message. In addition, when the MN is not registered, the new visitor entry generated and added to the visitor list in the GFA before receiving a response with respect to the registration request from the HA have to be deleted when a deny message of a binding update is received. When the response with respect to the registration request message from the HA is late and in the meanwhile the MN moves to an FA of another region and requests a registration, since the GFA already exists in the visitor list, there is a possibility of information transmission in a state where the registration is not performed practically, so that a weakness for a malicious call exists. In addition, since all of data packets always pass through the GFA, there is a problem of an increase in data transmission paths. In addition, in this method, a signal processing process for an IP handoff between a number of GFAs is not mentioned, so that when the MN moves to another GFA, the MN has to re-start an IP handoff registration request to the HA through the visited GFA.

A method provided in United States Patent 2004/0198383 A1 (Oct. 7, 2004) is to separate a paging foreign agent (PFA) for supporting paging of an MN from a controlling foreign agent (CFA) for controlling the PFA to form a hierarchical architecture in which the PFA is disposed below the CFA. In this method, the CFA and the PFA add their addresses to a fixed field inside an advertisement message extension to send the advertisement message extension to the MN, so that an IP handoff registration request of the MN can be performed. The method and operations provided therein are similar to an operation of requesting regional registration to the CFA by the MN in the regional registration method currently being discussed by the IETF. Therefore, when the signal packets for the handoff and IP data packets of the MN are used together, the problem of head-of-line blocking which is a characteristic of the IP network still remains. In addition, there is a problem in that the MN has to perceive existence of a GFA and request a registration of the GFA in addition to perform an operation of registering with the existing normal HA. In addition, operations performed when the MN moves from a CFA to another CFA are not mentioned, so that the MN has to re-start the IP handoff registration request of the HA through another visited CFA when the MN moves to another CFA.

United States Patent 2002/0143993 A1 (Oct. 3, 2002) is introduced to enable a mobile IP support in International Mobile Telecommunications-2000 (IMT-2000) employing an asynchronous method as in Europe. In consideration of the connection-oriented asynchronous method, a gateway general packet radio service (GPRS) support node (GGSN) constructed for IMT-2000 has functions of the FA and the GFA so as to selectively perform the function of the GFA, and a GPRS Tunneling Protocol (GTP) tunnel is guaranteed between the MN and the GGSN, so that the MN registers position information in the HA.[GPRA->GPRS] This method provides an advantage of applying the GFA method to an IMT-200 system in a European method. However, there are problems in that the MN has to include a function of perceiving existence of the GFA, all of the GGSNs have to include the GFA function, and a problem of the existing GFA method in that the GFA always broadcasts along a data path between the a correspondent Node (CN) and the MN and data transmission paths increase still remains. In addition, operations performed between a number of providers, that is, a number of GFAs are not mentioned.

United States Patent 2006/0018291 A1 (Jan. 26, 2006) employs a gateway router (GR) which has a similar concept and operation to that of the above GFA and a local mobility anchor (LMA) which as the same concept as the MA and provides a method in which, when the MN moves between the LMAs and the GR receives a CoA of the MN from a HA, data packets transmitted from a CN do not pass through the HA and are directly transmitted to the LMA at which the MN is disposed, so that packet paths reduce. In addition, in this method, the CoA of the MN is not transmitted to the CN, and a unit for protecting (hiding) a current position of the MN from the CN is provided. The method has a problem in that data of the CN always has to pass the GR. In addition, since data paths and signal packet transmission paths for a handoff (binding update, etc) are not separated from each other, when the same paths are used, the problem of head-of-line still remains. In addition, a case where a number of providers and a number of GRs exist is not mentioned. In addition, in order to apply the method in the existing Internet protocol version 6 (IPv4) not the IPv6, conventional operations of the HA have to be changed.

SUMMARY OF THE INVENTION

The present invention provides an Internet protocol (IP) handoff method capable of supporting a regional registration method and when a plurality of MAPs for transmitting signal packets and data packets for IP handoff while separating the signal packets and the data packets from each other exists and an IP address of a mobile node (MN) is changed while the MN moves from a mobile agent platform (MAP) to an adjacent MAP, sharing information on the MN by the two MAPs so as to performing a rapid IP handoff processing, using high altitude aeronautical platforms (HAAPs) which are disposed higher that a base station such as in the stratosphere or virtual private networks (VPNs) as transmission paths of the signal packets transmitted between the MAPs so as to rapidly process a head-of-line (HOL) problem in that transmission of the signal packets for the handoff is delayed by the data packets.

In addition, unlike the regional registration method using a gateway foreign agent (GFA), a content of the registration request message is transmitted from a foreign agent (FA) to a home agent (HA) as it is, so that it is possible to use the message for an existing mobile node which does not know the GFA method.

According to an aspect of the present invention, there is provided an IP (Internet protocol) handoff method including: (a) receiving an IP handoff registration request message from an FA (foreign agent) of an MN (mobile node) by a mobile agent platform (MAP) and determining whether or not the MN moves in the MAP; (b) when it is determined that the MN moves from another MAP, transmitting a message for requesting to add an entry of the MN to a border list of the another MAP; and (c) when it is determined that the MN moves in the same MAP and the FA is adjacent to the another MAP, transmitting a message for requesting to add the entry of the MN to the border list of the another MAP.

According to another aspect of the present invention, there is provided a computer-readable medium having embodied thereon a computer program for executing an IP handoff method in a MAP environment, wherein the IP handoff method including: (a) receiving an IP handoff registration request message from an FA (foreign agent) of an MN (mobile node) by a mobile agent platform (MAP) and determining whether or not the MN moves in the MAP; (b) when it is determined that the MN moves from another MAP, transmitting a message for requesting to add an entry of the MN to a border list of the another MAP; and (c) when it is determined that the MN moves in the same MAP and the FA is adjacent to the another MAP, transmitting a message for requesting to add the entry of the MN to the border list of the another MAP.

BRIEF DESCRIPTION OF THE DRAWINGS

The above and other features and advantages of the present invention will become more apparent by describing in detail exemplary embodiments thereof with reference to the attached drawings in which:

FIG. 3 is a view showing an MN moving to another MAP according to an embodiment of the present invention;

FIG. 4a is a view showing a type of a registration request message;

FIG. 4b is a view showing a type of a registration reply message;

DETAILED DESCRIPTION OF THE INVENTION

Hereinafter, exemplary embodiments of the present invention will be described in detail with reference to the attached drawings.

Figure 1:
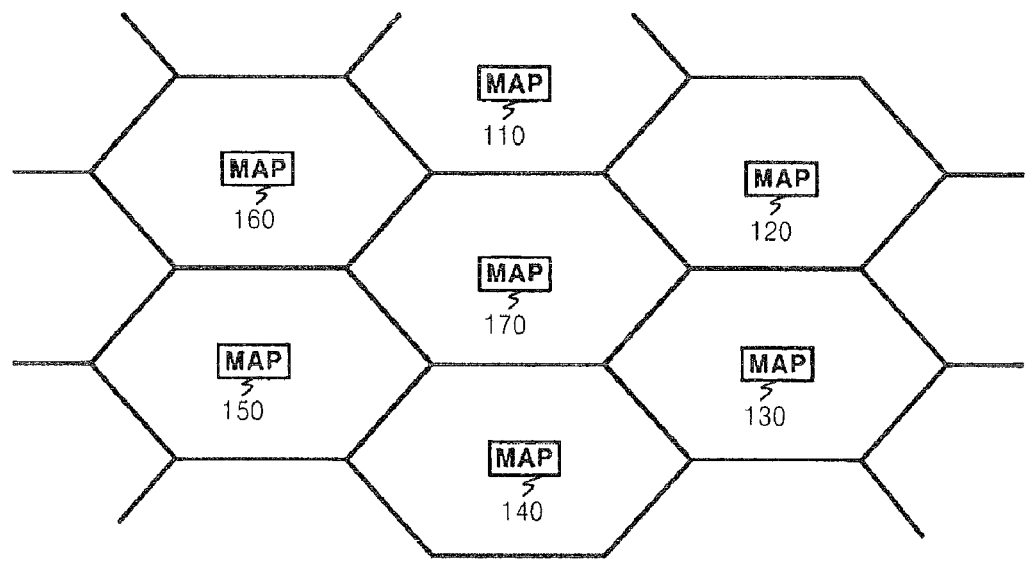
FIG. 1 is a view showing a structure of jurisdiction areas of mobile agent platforms (MAPs) according to an embodiment of the present invention.

FIG. 1 is a view showing a structure of jurisdiction areas of mobile agent platforms (MAPs) according to an embodiment of the present invention.

Referring to FIG. 1, MAPs for transmitting signal packets and data packets used for Internet protocol (IP) handoff while separating the signal packets and the data packets from each other are used instead of a gateway foreign agent (GFA). When a plurality of the MAPs are adjacent to each other, jurisdiction areas of the MAPs have a shape of a hexagon similarly to that in a cell division method used in an existing code division multiple access (CDMA). The number of MAPs adjacent to a MAP (for example, a MAP 170 in FIG. 1) is maximum 6, that is, MAPs 110 to 160 as shown in FIG. 1.

In this case, the MAP 170 has a number of mobile agents (MAs) in its jurisdiction area. Some MAs of the MAP 170 may be adjacent to an adjacent MAP, and the other MAs may not be directly adjacent to the adjacent MAP and exist only inside the MAP 170.

Figure 2:
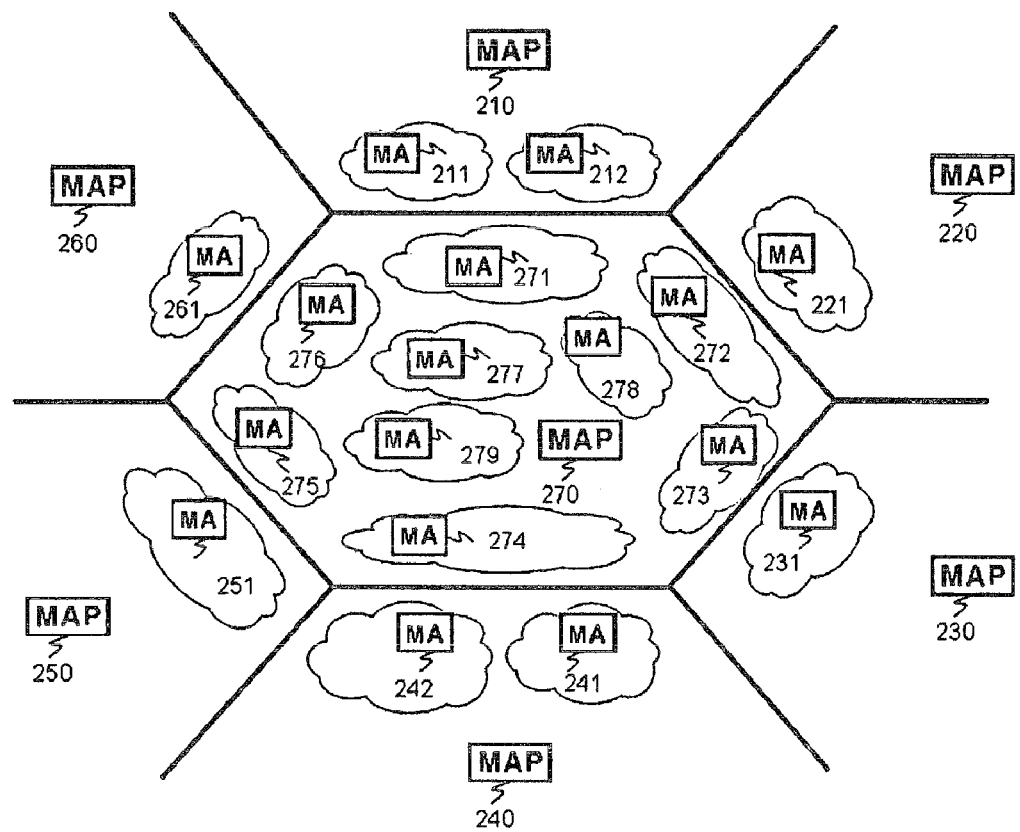
FIG. 2 is a view showing a structure of jurisdiction areas of mobile nodes (MNs) of MAPs according to an embodiment of the present invention.

FIG. 2 is a view showing a structure of jurisdiction areas of mobile nodes (MNs) of MAPs according to an embodiment of the present invention.

Referring to FIG. 2, a cloud represents a jurisdiction area of an MA disposed inside the cloud. When an MN which registers with the MA as a subscriber is operated, the MA serves as a home agent (HA). When a subscriber which does not register with the MA enters the area and requests a service, the MA serves as a foreign agent (FA).

MAs 271, 272, 273, 274, 275, and 276 in a jurisdiction area of a MAP 270 are adjacent to jurisdiction areas of MAPs 210, 220, 230, 240, 250, and 260, respectively.

However, MAs 277, 278, and 279 are inside the jurisdiction area of the MAP 270. Therefore, in order for MNs in MAs inside a MAP to move outside a jurisdiction of the MAP, the MNs have to pass through a jurisdiction area of the MA adjacent to a jurisdiction area of another MAP. For example, in order for an MN in the MA 277 to move to the jurisdiction area of the MAP 210, the MN has to pass through the MA 271 which is adjacent to the MAP 210 and move to a jurisdiction area of an MA 211 or 212. Similarly, since the MAs 211 and 212 in the jurisdiction area of the MAP 210 are adjacent to the MAP 270, in order for an MA (not shown) in the jurisdiction area of the MAP 210 to move to the jurisdiction of the MAP 270, the MA has to pass through the MA 211 or 212 inside the jurisdiction area of the MAP 210 and move to the MA 271.

In addition, the MAPs 210, 220, 230, 240, 250, 260, and 270 have a border list in addition to an existing visitor list and a temporary list. The MAP 270 which has a visitor list including MN entries transmits a visitor list of the MA 271 (that is, entries of MNs which enter to the jurisdiction area of the MA 271 and resisters with the MA 271 successively so as to be registered to the visitor list of the MA 271) to the MAP 210. Similarly, visitor lists of the MAs 273, 274, 275, and 276 are transmitted to the MAPs 230, 240, 250, and 260.

The MAP 270 receives visitor lists of the MAs 211 and 212 from the MAP 210 and stores the visitor lists in the border list. Similarly, the MAP 270 receives visitor lists of MAs 221, 231, 241 and 242, 251, and 261 from the MAPs 220, 230, 240, 250, and 260, respectively, and stores all of the visitor lists in the border list.

In this manner, a MAP of the MAPs including the MAPs 210 to 260 transmits visitor lists including visitors which visit networks of MAs adjacent to jurisdictions areas of MAPs in border areas of the MAP to the corresponding adjacent MAPs, and receives visitor lists of MAs which are not in the jurisdiction of the MAP and are adjacent to the MAP from the corresponding MAPs to store the visitor lists in its border list.

FIG. 3 is a view showing an MN moving to another MAP according to an embodiment of the present invention.

Referring to FIG. 3, thick lines 351 to 357 are paths (a type of a link) for transmitting IP handoff signal packets between MAPs. The links are constructed by using high altitude aeronautical platforms (HAAPs) or virtual private networks (VPNs).

The number of links between a MAP and adjacent MAPs may be maximum 6 when jurisdiction areas of the MAPs are arrayed as shown in FIG. 1. A block 313 shown in FIG. 3 represents a jurisdiction area of a MAP 310. For the convenience of description, the hexagon shape in FIGS. 1 and 2 is changed to a block shape. Similarly, a block 323 shown in FIG. 3 represents a jurisdiction area of a MAP 320. A jurisdiction area of a MAP 330 is not shown in the figure.

MAs 310-A, 310-B, 310-C to 310-*n* in FIG. 3 represent MAs in the jurisdiction of the MAP 310, and MAs 320-A, 320-B to 320-*n* represent MAs in the jurisdiction of the MAP 320.[MAP(301)->MAP(310)]

A cloud shape represents a network representing a jurisdiction area of the MA 310-B, and the other cloud shape represents a network representing a jurisdiction area of the MA 320-A. Although not shown in the figure, the MAs 310-A to 310-*n* and 320-B to 320-*n* also have their networks.

The network managed by the MA 310-B and a network managed by the MA 310-A, which is not shown, represent networks of MAs adjacent to the MAP 320, and the network managed by the MA 320-A represents a network adjacent to the MAP 310. On the other hand, networks managed by the MAs 310-C to 310-*n* represent network which are not adjacent to the MAP 320, and networks managed by the MAs 320-B to 320-*n* represent networks which are not adjacent to the MAP 310.

Therefore, it means that when an MN in the jurisdiction area 313 of the MAP 310 moves to the jurisdiction area 323 of the MAP 320, the MN has to pass through the network representing the jurisdiction area of the MA 310-A or 310-B and move to the network representing the jurisdiction area of the MA 320-A.

In addition, an MN 312 with a dotted line and an MN 322 with a solid line represent the same MN. Namely, it means that the MN 312 in the network of the MA 310-B which is in the MAP 310 and adjacent to the MAP 320 moves to the network of the MA 320-A which is in the MAP 320 and adjacent to the MAP 310 as shown using an arrow line 361 and becomes the MN 322.

In a case shown in FIG. 3, a border list of the MAP 310 includes a visitor list of the MA 320-A, and a border list of the MAP 320 includes visitor lists of the MA 310-A and the MA 310-B. Therefore, before the MN 312 becomes the MN 322, the border list of the MAP 320 includes an entry corresponding to the MN 312.

FIG. 4*a* is a view showing a type of a registration request message.

Referring to FIG. 4a, a type of a standardized registration request message which is transmitted by an MN in a network of an FA inside a MAP to an HA through the FA, that is, a type of a registration request message for a handoff transmitted by the MN to the HA through the FA is shown. A Lifetime 410 can be modified by the HA. Fields 420, 430 and 440 represent a home address of the MN, an HA, and a CoA of the FA, respectively.

FIG. 4b is a view showing a type of a registration reply message.

Referring to FIG. 4b, a standardized registration reply message generated by the HA with respect to the standardized registration request is shown. Each filed represents the same meaning as in FIG. 4a.

Figure 5:
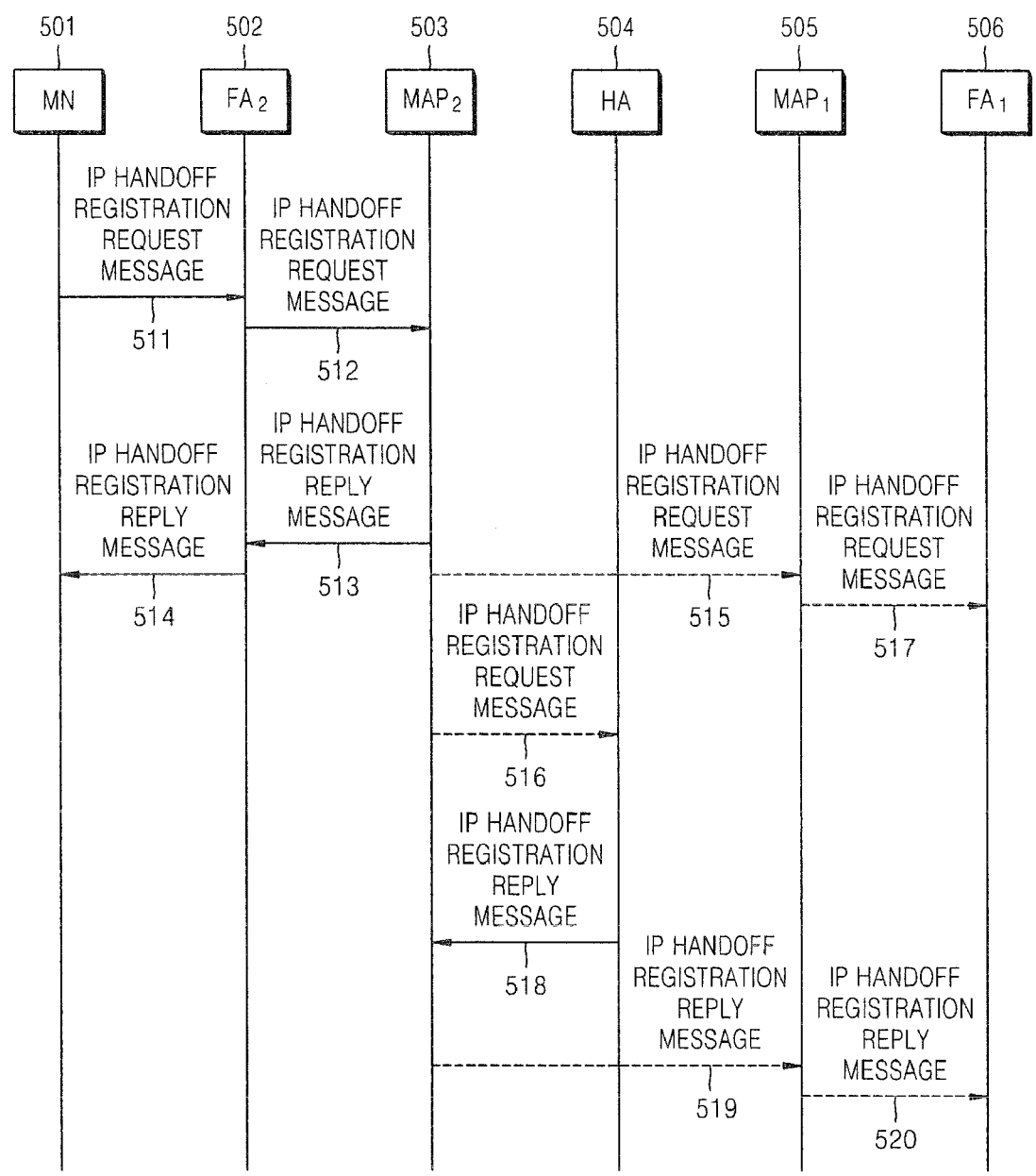
FIG. 5 is a flowchart showing an Internet protocol (IP) handoff operation performed when an MN moves to another MAP according to an embodiment of the present invention.

FIG. 5 is a flowchart showing an IP handoff operation performed when an MN moves to another MAP according to an embodiment of the present invention.

Referring to FIG. 5, a case where an MN visits from a network in an area of an FA to a network of another FA is shown. An MN 501 in FIG. 5 becomes the MN 322 in FIG. 3, an FA2 502 in FIG. 5 becomes the MA 320-A in FIG. 3, an MAP2 503 in FIG. 5 becomes the MAP 320 in FIG. 3, an HA 504 in FIG. 5 becomes one of MAs included in the MAP 310, the MAP 320, and the MAP 330 in FIG. 3 or an external MA (not shown), a MAP1 505 in FIG. 5 becomes the MAP 310 in FIG. 3, and an FA1 506 in FIG. 5 becomes the MA 310-B in FIG. 3.

When the MN 501 transmits an IP handoff registration request message (shown in FIG. 4a) to the FA2 502 in operation 511, the FA2 502 transmits the IP handoff registration request message to the MAP 503 in operation 512. Next, the MAP2 503 determines whether or not an entry of the MN 501 exists in a border list of the MAP2 503 (determination can be performed by using a home address of the MN 501), immediately transmits a registration reply message to the FA2 502, perceives that the MN 501 moves from a jurisdiction area of the MAP1 505, transmits the IP handoff registration request message to the MAP1 505 in operation 515, and transmits the IP handoff registration request message to the HA 504 in operation 516. The FA2 502 transmits the IP handoff registration reply message to the MN 501 in operation 514. The MAP1 505 which receives the IP handoff registration request message in operation 515 checks the home addresses of MNs in its visitor list and transmits the IP handoff registration request message to the FA1 506 in operation 517. The registration request messages transmitted in operations 511, 512, 515 to 517 are the IP handoff registration request message generated by the MN 501 and are the same unlike in an existing regional registration method.

When the MAP2 receives a registration reply message from the HA 504 in operation 518, the MAP2 503 modifies a content in an internal list by using a content of the registration reply message and transmits the modified content of the registration reply message to the MAP1 505 in operation 519. The MAP1 505 transmits the IP handoff registration reply message to the FA1 506, and the MAP1 505 deletes the entry of the MN 501 from its visitor list.

Figure 6:
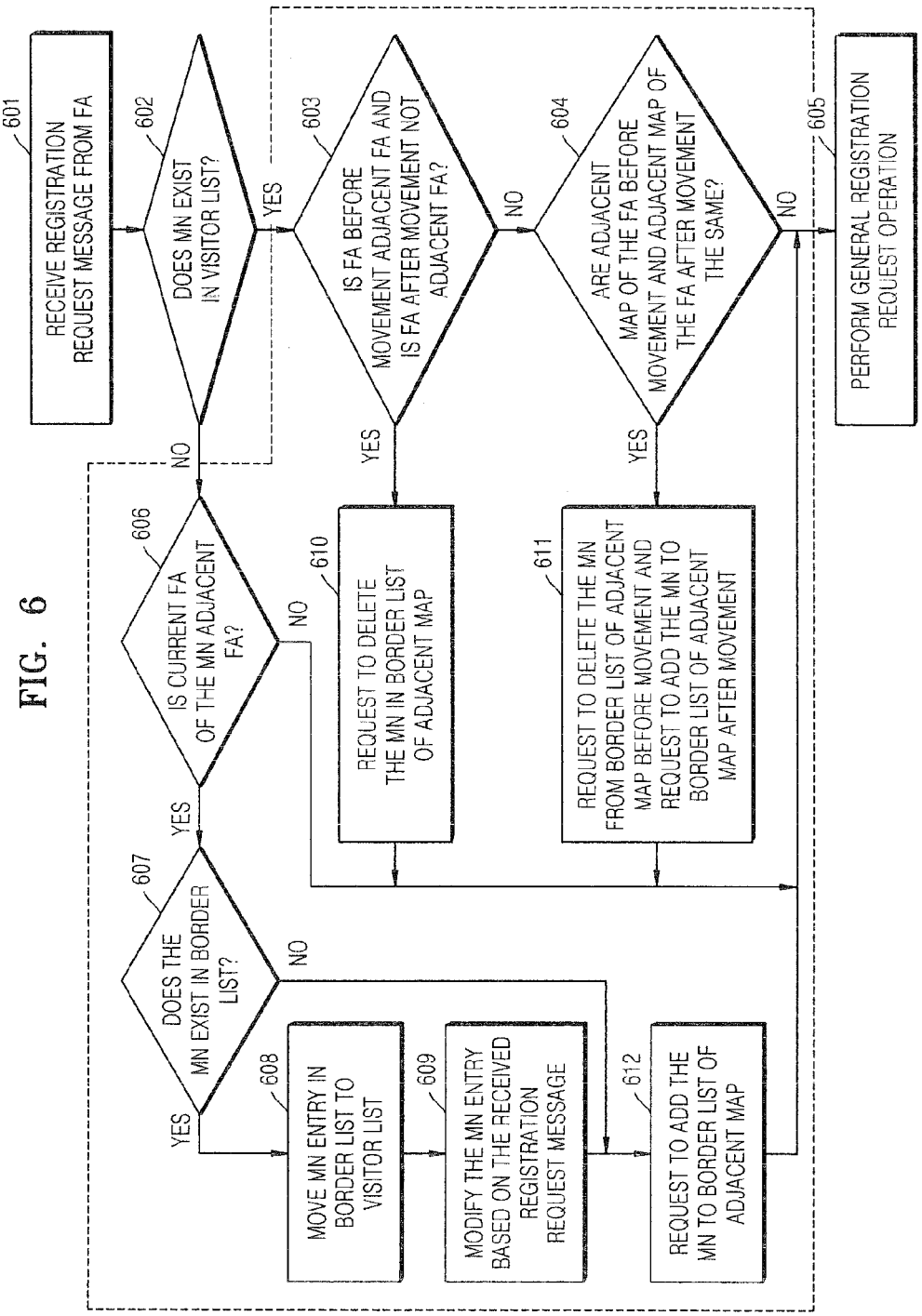
FIG. 6 is a flowchart showing operations in which a MAP receives and processes a registration request message from a foreign agent (FA) according to an embodiment of the present invention.

FIG. 6 is a flowchart showing operations in which a MAP receives and processes a registration request message from a foreign agent (FA) according to an embodiment of the present invention.

Referring to FIG. 6, operation 601 of receiving an IP handoff registration request message that is transmitted from an MN from an FA and operation 602 of determining whether the MN exists in a visitor list are the same as those in an existing MAP operation method, and operations in a dotted line are added between operations 602 and 605 so as to perform a rapid IP handoff by connecting a plurality of MAPs to each other.

In operation 601, an MAP receives the IP handoff registration request message of the MN from the FA. Next, in operation 602, it is determined whether or not the MN which transmits the IP handoff registration request message exists in a visitor list inside the MAP. When the MN does not exist in the visitor list in operation 602, operation 606 follows operation 602. When the MN exists in the visitor list, operation 603 follows operation 602.

In operation 603, it is determined whether or not an FA (old FA) from which the MN which transmits the IP handoff registration request message moves is an MA adjacent to the MAP, and the FA (current FA) to which the MN moves is an MA which is inside the MAP and is not in an area to the MAP. When the old FA is the adjacent area, and the current FA is not the adjacent area, operation 610 follows, and if not, operation 604 follows.

In operation 604, it is determined whether or not the old FA from which the MN moves and the current FA to which the MN moves are MAs in the adjacent area of the MAP, and an MAP adjacent to the old FA from which the MN moves and an MAP adjacent to the current FA to which the MN moves are the same. In operation 604, when the FAs from and to which the MN moves are the MAs in the adjacent area of the MAP, and the MAP adjacent to the old FA from which the MN moves and the MAP adjacent to the current FA to which the MN moves are the same, operation 605 follows, and if not, operation 611 follows.

Operation 605 is an operation performed by an existing MAP for processing the IP handoff registration request message transmitted from the MN.

In operation 611, the IP handoff registration request message transmitted from the MN along with a message for removing the MN from a border list of the MAP (old adjacent MAP) which is adjacent to the old FA from which the MN moves are transmitted to the MAP adjacent to the old FA from which the MN moves, and the IP handoff registration request message transmitted from the MN along with a message for adding the MN to a border list of the MAP (current adjacent MAP) which is adjacent to the current FA to which the MN moves are transmitted to the MAP adjacent to the current FA to which the MN moves. Thereafter, operation 605 follows.

In operation 610, the IP handoff registration request message transmitted from the MN along with a message for removing the MN from the border list of the MAP which is adjacent to the old FA from which the MN moves are transmitted to the MAP adjacent to the FA from which the MN moves. Thereafter, operation 605 follows.

In operation 606, it is determined whether or not the FA of the MN is an FA in an adjacent area adjacent to another MAP. When the FA is in the adjacent area, operation 607 follows, and if not, operation 605 follows.

In operation 607, it is determined whether or not the MN exists in the border list of the MAP (determination is performed by using the home address (412 in FIG. 4a) of the MN stored in the entry of the border list). When the MN exists in the border list, operation 608 follows, and if not, operation 612 follows.

In operation 608, the entry of the MN in the adjacent area of the MAP is transferred to a visitor list inside the MAP (deleted in the border list), and operation 609 follows. In operation 609, according to the content of the IP handoff registration request transmitted from the MN, the entry of the MN in the visitor list inside the MAP (CoA, lifetime, or the like) is modified, and operation 612 follows.

In operation 612, the IP handoff registration request message transmitted from the MN along with a message for adding the MN to the border list of the adjacent area MAP are transmitted to the adjacent area MAP, and operation 605 follows.

Figure 7:
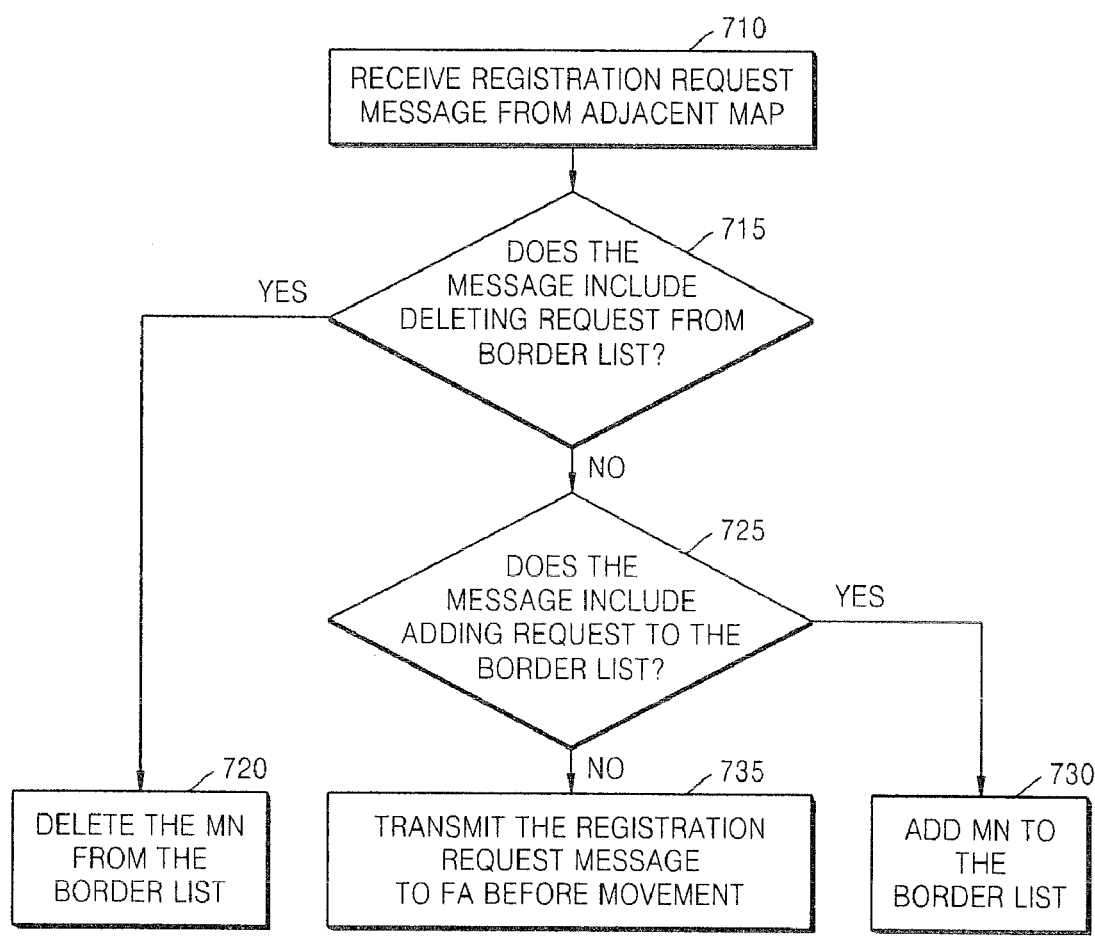
FIG. 7 is a flowchart showing operations in which a MAP receives and processes a registration request message from an adjacent MAP according to an embodiment of the present invention.

FIG. 7 is a flowchart showing operations in which a MAP receives and processes a registration request message from an adjacent MAP according to an embodiment of the present invention.

Referring to FIG. 7, in operation 710, the IP handoff registration request message of the MN which visits the FA of the adjacent area along with a message for adding/deleting the MN to/from the border list of the MAP are received from the MAP in the adjacent area. Next, in operation 715, it is determined whether or not a content of the message transmitted along with the IP handoff registration request message of the MN which visits the FA in the adjacent area from the MAP in the adjacent area includes a deleting request from the border list. When it is determined that the content includes the deleting request, operation 720 follows, and if not, operation 725 follows.

In operation 720, an entry of the MN is deleted from the border list. In operation 725, it is determined whether or not the content includes an adding request to the border list. When it is determined that the content includes the adding request, operation 730 follows, and if not, operation 735 follows. In operation 730, the entry of the MN is added to the border list. In operation 735, the IP handoff registration request message of the MN is transmitted to the FA (old FA) from which the MN moves.

Figure 8:
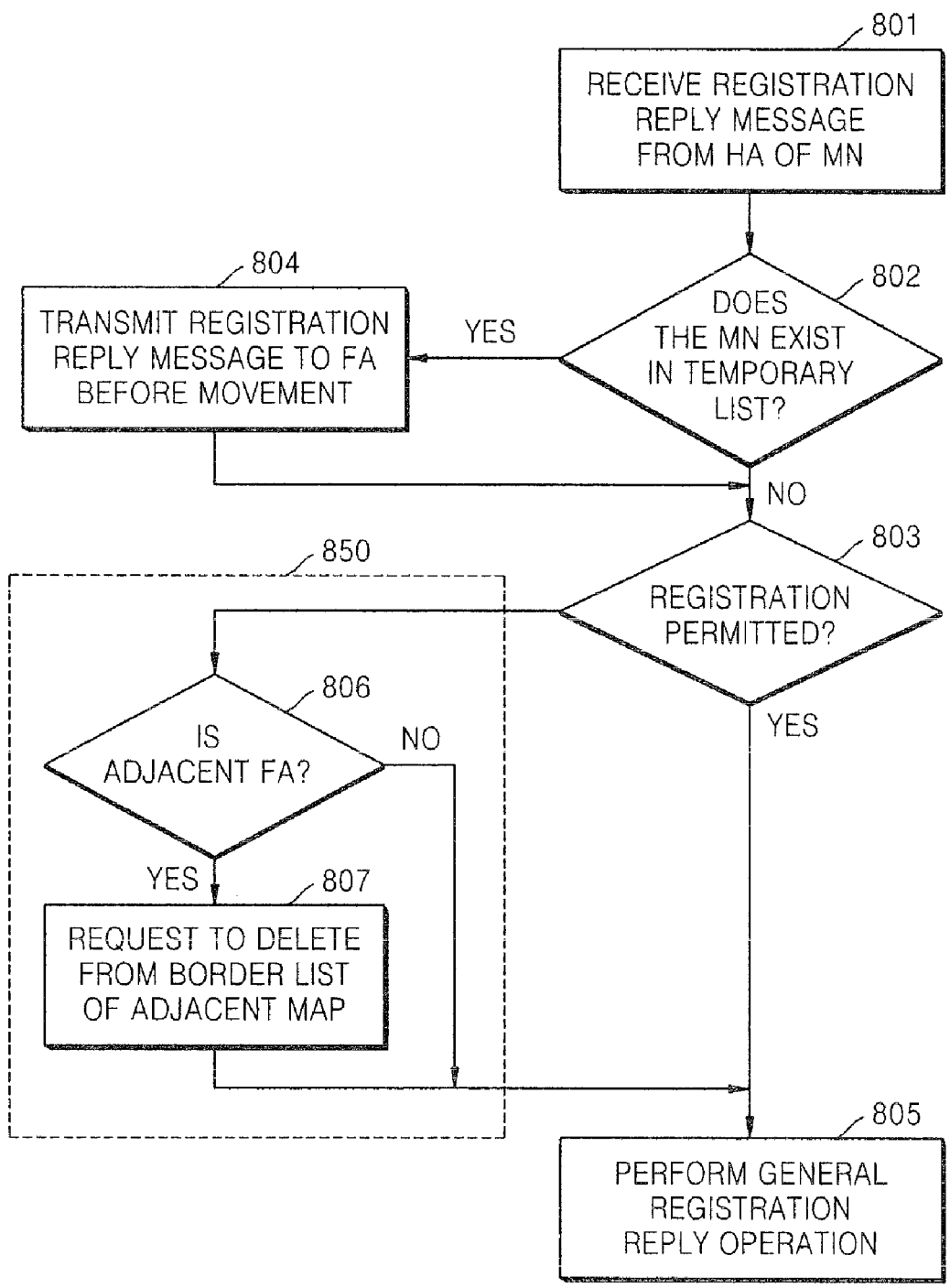
FIG. 8 is a flowchart showing operations in which a MAP receives and processes a registration reply message from a home agent (HA) according to an embodiment of the present invention.

FIG. 8 is a flowchart showing operations in which a MAP receives and processes a registration reply message from a home agent (HA) according to an embodiment of the present invention.

Referring to FIG. 8, operation 801 of receiving an IP handoff registration reply message from an HA of an MN, operation 802 of determining whether the MN exists in a temporary list, operation 804 of transmitting the registration reply message to an FA from which the MN moves, operation 803 of determining whether the message includes registration permission, and operation 805 of processing the IP handoff registration according to an existing registration reply operation are the same as those in an existing MAP operation method. Particularly, operations in a block 850 with dotted line are added to between operations 803 and 805 so as to connect a plurality of MAPs to each other for a rapid IP handoff.

In operation 801, the registration reply message is received from the HA of the MN. In operation 802, it is determined whether or not the MN exists in the temporary list inside a MAP. When the MN exists in the temporary list, operation 804 follows, and if not, operation 803 follows. In operation 804, the registration reply message transmitted from the HA of the MN is transmitted to the FA (old FA) from which the MN moves, and operation 803 follows.

In operation 803, it is determined whether or not a content of the registration reply message transmitted from the HA of the MN includes registration permission. When the registration permission is included, operation 805 follows, and if not, operation 806 follows. In operation 806, it is determined whether or not the current FA of the MN is in a border area. When the current FA is in the border area, operation 807 follows, and if not, operation 805 follows. In operation 807, the content of the registration reply message transmitted from the HA of the MN is provided with a content for deleting the MN from the border list and then transmitted to the MAP of the border area, and operation 805 follows. In operation 805, the registration reply operation transmitted from the HA of the MN for the IP handoff requested from the MN is processed by the existing MAP.

Figure 9:
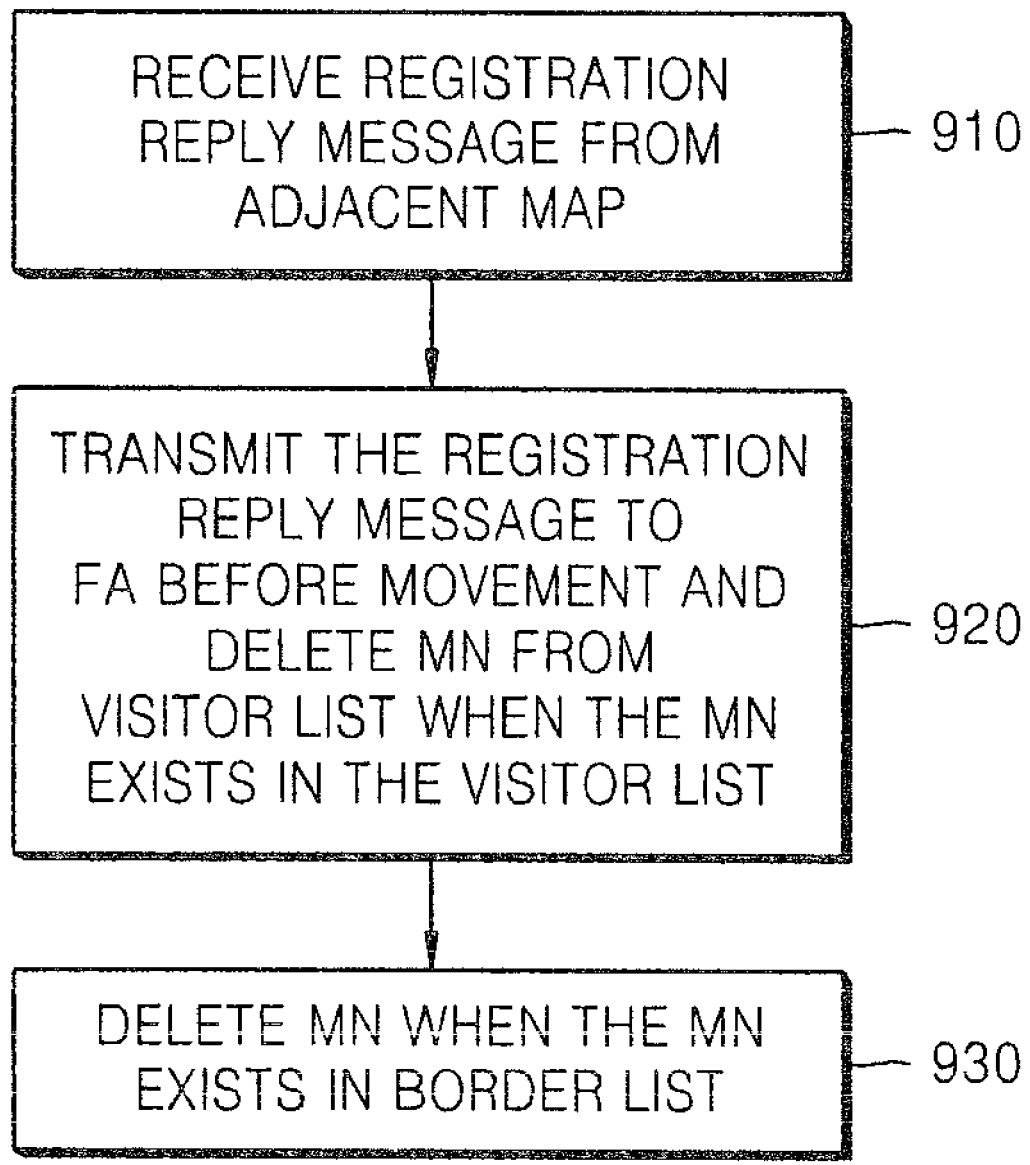
FIG. 9 is a flowchart showing operations in which a MAP receives and processes a registration reply message from an adjacent MAP.

FIG. 9 is a flowchart showing operations in which a MAP receives and processes a registration reply message from an adjacent MAP.

Referring to FIG. 9, in operation 910, a registration replay message of the MN is received from the MAP in the border area. Next, in operation 920, when the MN exists in a visitor list inside the MAP, the registration reply message of the MN is transmitted to the old FA from which the MN moves, and the entry of the MN is deleted from the visitor list inside the MAP. In operation 930, when the entry of the MN exists in the border list inside the MAP, the entry of the MN is deleted.

According to the IP handoff method, information used for the handoff processing between MAPs is transmitted by using the high altitude aeronautical platforms (HAAPs) or the virtual private networks (VPNs), so that it is possible to provide rapid and seamless IP handoff services. In addition, unlike the regional registration method using the gateway foreign agent (GFA), the content of the registration request message is transmitted from the FA to HA as it is, so that the message can be used for an existing mobile node which does not know the GFA method.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An IP (Internet protocol) handoff method involving mobile agent platforms having border lists and visitor lists comprising:
   receiving an IP handoff registration request message from an FA (foreign agent) of an MN (mobile node) by a first mobile agent platform (MAP) having a first MAP region and determining whether or not the MN moves in the first MAP region and wherein the FA is located in the first MAP region;
   when it is determined that the MN moves from a second MAP region, transmitting a message for requesting to add an entry of the MN to a border list of a second MAP in the second MAP region; and
   when it is determined that the MN moves in the first MAP region and the FA is adjacent to the second MAP region, transmitting a message for requesting to add the entry of the MN to the border list of the second MAP, wherein the first MAP region and the second MAP region are two separated MAP regions.

2. The IP handoff method of claim 1, wherein in determining whether or not the MN moves in the first MAP region, it is determined whether or not the MN moves in the first MAP region based on a determination whether or not the entry of the MN is included in a visitor list of the first MAP.

3. The IP handoff method of claim 1, further comprising: when it is determined that the MN moves from the second MAP region, and the entry of the MN is included in the border list of the second MAP, moving the entry of the MN to a visitor list of the first MAP; and modifying the entry of the MN in the visitor list based on the IP handoff registration request message.

4. The IP handoff method of claim 1, further comprising, when the MN moves from an FA which is in the first MAP region and adjacent to the second MAP region to an FA which is not adjacent to the second MAP region, transmitting a message for requesting to delete the entry of the MN from a border list of the second MAP.

5. The IP handoff method of claim 1, further comprising, when the MN moves from an first MA (mobile agent) which is adjacent to the second MAP region to an second MA which is not adjacent to the second MAP region and is adjacent to a different MAP region and wherein the first MA and the second MA are in the first MAP region, transmitting a message for requesting to delete the entry of the MN from the border list of the second MAP which is adjacent to the first MA.

6. The method of claim 1, further comprising:
   when the first MAP receives the IP handoff registration request message from the FA of the MN, transmitting the IP handoff registration request message to a HA (Home Agent) of the MN, and receiving an IP handoff reply message from the HA; and
   when the reply message does not permit the registration, and the FA of the MN is adjacent to a new MAP region, transmitting a message for requesting to delete an entry of the MN from a border list of the first MAP in which the FA of the MN is included before movement.

7. The IP handoff method of claim 1, further comprising:
   when the first MAP receives the IP handoff registration request message from the FA of the MN, transmitting the IP handoff registration message to an HA of the MN, and receiving an IP handoff reply message from the HA;
   when it is determined whether the MN moves from the second MAP, transmitting the IP handoff reply message to the second MAP; and
   when the entry of the MN is included in a visitor list of the second MAP, deleting the entry of the MN, and transmitting the IP handoff reply message to the FA from which the MN moves.

8. A non-transitory computer-readable medium having embodied thereon a computer program for executing an IP (Internet protocol) handoff method in a MAP (mobile agent platform) environment, wherein the IP handoff method involving mobile agent platforms having border lists and visitor lists comprising:
   receiving an IP handoff registration request message from an FA (foreign agent) of an MN (mobile node) by a first mobile agent platform (MAP) having a first MAP region and determining whether or not the MN moves in the first MAP region and wherein the FA is located in the first MAP region;
   when it is determined that the MN moves from a second MAP region, transmitting a message for requesting to add an entry of the MN to a border list of a second MAP in the second MAP region; and
   when it is determined that the MN moves in the first MAP region and the FA is adjacent to the second MAP region, transmitting a message for requesting to add the entry of the MN to the border list of the second MAP, wherein the first MAP region and the second MAP region are two separated MAP regions.

* * * * *